Sept. 27, 1966 J. FRANIA ETAL 3,275,009
PNEUMATIC CONSTANT SPEED CONTROL APPARATUS FOR POWER MACHINES
Filed Feb. 27, 1963 4 Sheets-Sheet 2
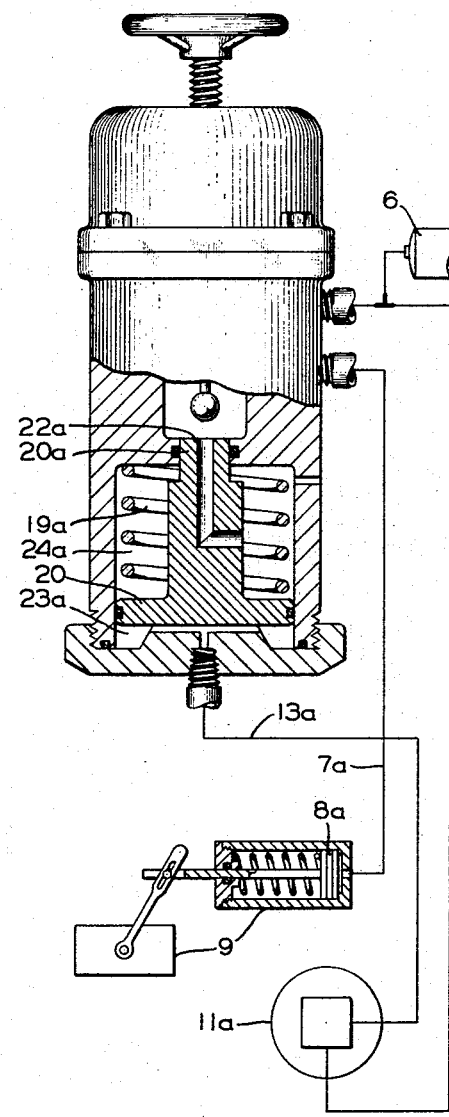
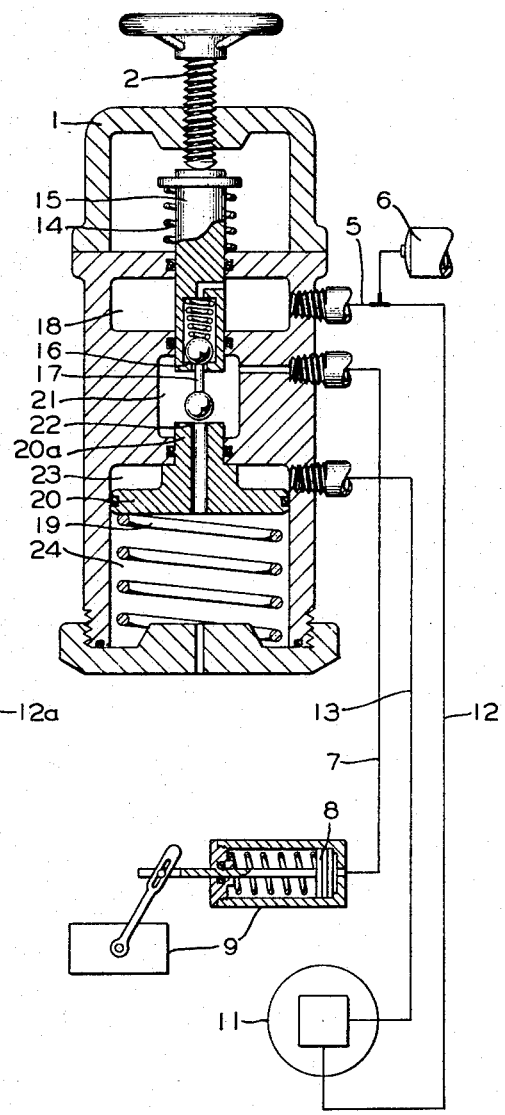
INVENTORS
Josef Frania
Fritz Scheele
BY Ralph W. McIntire
Attorney Sept. 27, 1966   J. FRANIA ETAL   3,275,009
PNEUMATIC CONSTANT SPEED CONTROL APPARATUS FOR POWER MACHINES
Filed Feb. 27, 1963   4 Sheets-Sheet 3

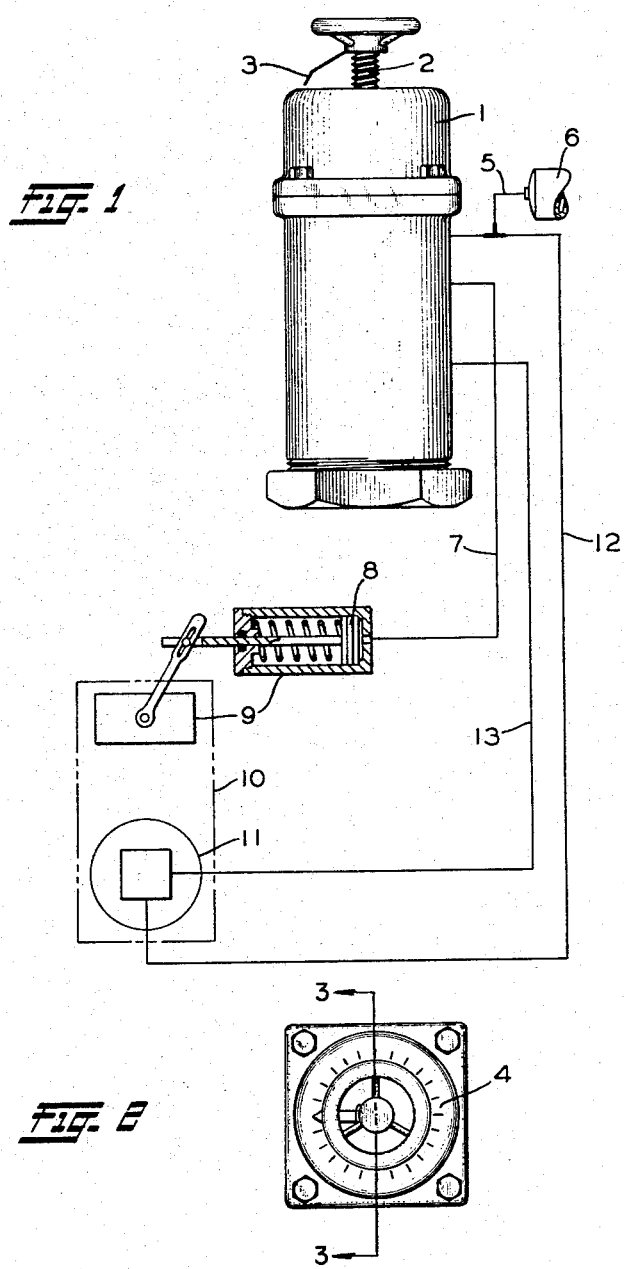

INVENTORS
Josef Frania
BY Fritz Scheele
Ralph W. McIntire Jr.
Attorney

Sept. 27, 1966 J. FRANIA ETAL 3,275,009
PNEUMATIC CONSTANT SPEED CONTROL APPARATUS FOR POWER MACHINES
Filed Feb. 27, 1963 4 Sheets-Sheet 4

INVENTORS
Josef Frania
BY Fritz Scheele
Ralph W. McIntosh
Attorney

United States Patent Office 3,275,009
Patented Sept. 27, 1966

3,275,009
PNEUMATIC CONSTANT SPEED CONTROL
APPARATUS FOR POWER MACHINES
Josef Frania and Fritz Scheele, Hannover, Germany, assignors to Westinghouse Bremsen-Gesellschaft m.b.H., Hannover, Germany
Filed Feb. 27, 1963, Ser. No. 261,430
Claims priority, application Germany, Mar. 2, 1962, W 31,772
5 Claims. (Cl. 137—36)

This invention relates generally to pneumatic constant speed control apparatus for power machines, and relates particularly to apparatus for automatically maintaining the revolutions per unit time of a power machine at preselected values despite the loading on the machine.

Heretofore, constant speed control apparatus has included hydraulically activated control members in combination with a hydraulic pressure pick-up device or measuring pump providing an output pressure variable proportionately with the revolutions per unit time of the power machine. Hydraulic measuring pumps, however, do not deliver reliable pressure values since such pumps depend upon the respective viscosity of the pressure fluid, which viscosity alters with the temperature. Furthermore, hydraulic systems generally have the additional disadvantage that relatively greater fluctuations attend its control effect.

In addition, there are known control arrangements which are equipped with a large number of electrical control members such as electrical generators for obtaining electrical values corresponding to revolutions per unit time of the power machine. Arrangements of this type are complicated and expensive.

The present invention solves the problem of controlling the energy supply to a power machine or to the operating revolution moment controllable drive in such a manner that the adjustable revolutions per unit time of the machine remains constant even with varied operating output or engine load. To achieve this result, there is provided in the apparatus a means for providing a pressure which varies with variations in engine revolutions. The present invention utilizes pneumatic control equipment to avoid the above-discussed disadvantages of hydraulic equipment.

The present invention comprises a control element that is connected to an auxiliary air reservoir by means of piping. An initial pressure, which is developed through means of a hand operated thread spindle or through means of a pneumatic servo mechanism in the control element, is provided through piping on the control piston of a conventional regulating device whereby the disposition of the control piston along the operating path of the piston determines the output of the controlled power machine or the controlled regulatable drive. The power machine or the regulatable drive operates an engine revolution dependent pressure pick-up device which is connected to the auxiliary air reservoir by means of a piping and provide an output pressure proportional to the engine revolutions, which pressure is delivered by means of piping to the control member wherein a definite coordinated action between the disposition of the control piston along its path and the means responsive to the revolution dependent control pressure provides a maintaining of selected engine revolutions per unit time proportional to the disposition of the control piston along its path.

The control element is particularly characterized in having an intake valve seat located in the control piston, which piston is selectively positioned along its path by means of a hand operated thread spindle or by means of a positive operating pneumatic apparatus. An exhaust valve seat is disposed in the open end of the smaller piston of a graduated pair of integral pistons, the larger piston of the graduated piston pair being activated on the one side by means of a pressure spring, and on the other side by the output pressure of the pressure pick-up device. The pressure which is provided in a control chamber by means of the intake valve or the exhaust valve is supplied to the control piston of a conventional fuel regulating device.

In one modification of the control member, combined with a pressure pick-up device that provides a pressure that varies directly with engine revolutions per unit time, the output pressure from the pick-up device is applied to the large piston of the graduated piston upon the side thereof which carries the exhaust valve. The pressure spring, however, is operative on the opposite side. In another modification of control member where the pressure pick-up device provides a pressure inversely proportional to engine r.p.m., the pressure spring is disposed on the opposite side of the piston. It will be noted, however, that in both cases the chamber which contains the pressure spring is the exhausting chamber.

An additional aspect of the invention relates to an optional element comprising an additional piston that is controlled along its path by means of a conventional regulating valve in such a manner that this piston's directional movement is transferable to an intake valve piston of the type above described by means of a rocker arm that can be rotated around an axle to thus effectively substitute for the hand operated spindle above described. If desired, in the place of the piston and the regulating valve, it is possible to provide a conventional multiple position regulating device as, for example, a 15-position regulating device, and that this piston can, in the conventional manner, be activated in accordance with a program by means of an equal number of electro-pneumatic valves whereby the program of the electro-pneumatic valve can be transmitted either by means of a hand controlled drum switch or by means of a remote control operated by radio. In summary, the additional piston or the multiple position regulating device is added to the intake valve piston in a coaxial arrangement in such a manner that its path or direction is transferable directly to operate the intake valve piston whenever the rocker arm is eliminated.

The invention and its objects will be more readily apparent from the drawing, in which:

FIG. 1 is a schematic diagram of a pneumatic constant speed control apparatus in accordance with the present invention.

FIG. 2 is a top plan view of the control element shown in FIG. 1.

FIG. 3 is a cross-sectional view of the control element of FIG. 2 taken substantially along the line 3—3 of FIG. 2.

FIG. 4 is a cross-sectional view of a modified control element.

Figure 5:
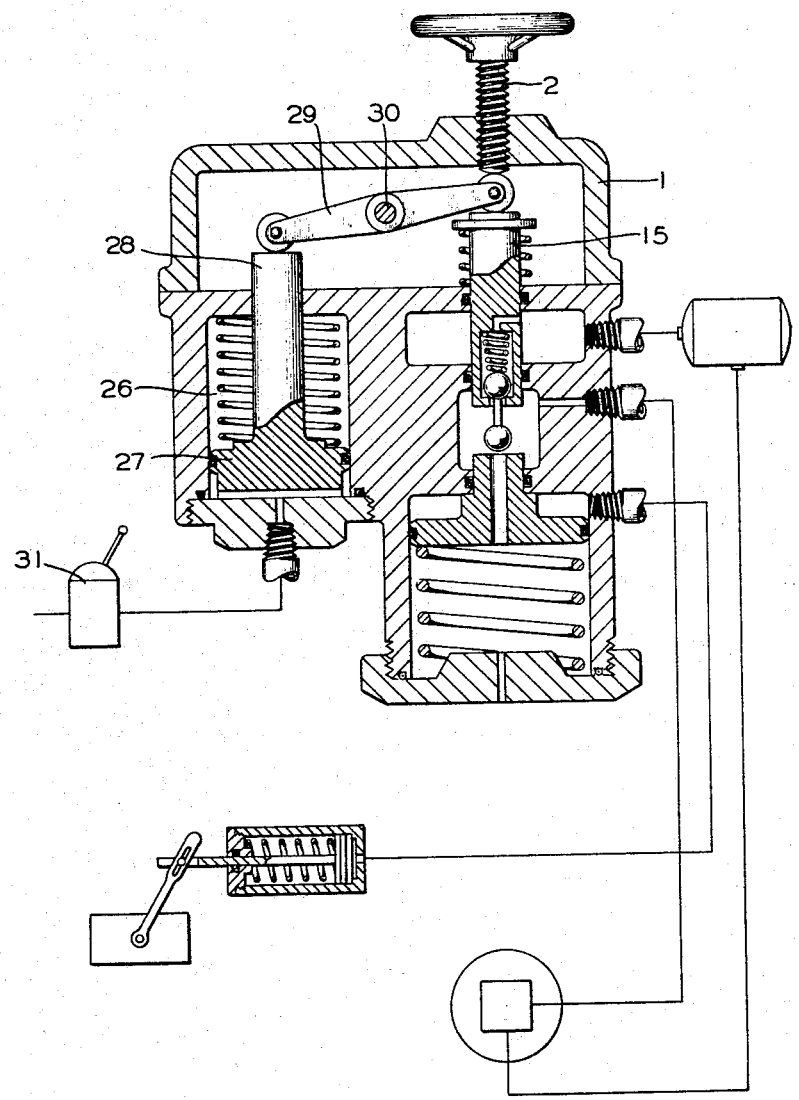
FIG. 5 is a cross-sectional view of the control element of FIG. 3 shown in combination with remote control responsive mechanism.

In FIG. 1, the control element 1 is operated by means of the hand operated thread spindle 2. The position of the spindle is determined with the assistance of a pointer 3 and a scale 4 as shown in FIG. 2. The scale 4 corresponds to total engine revolutions per unit of time. The internal construction of the control element 1 will be hereinafter discussed in detail. The control element 1 is connected to an auxiliary air reservoir 6 by means of piping 5, the reservoir 6 being subjected to a constant air pressure. The piston 8 of a regulating device 9 is activated by the initial pressure that is provided by means of the control element 1 through means of the piping 7. A power machine, such as a motor or steam engine, is indicated by the dashed line rectangle 10, which power machine has an energy supply that is controlled by means of the regulating device 9. The rectangle 10, however, can also be illustrative of a regulatable drive, as, for example, a hydra-dynamic drive, in which event the regulating device 9 controls the operative revolution moment thereof.

The revolutions of the power machine or engine are transferred to a pneumatic engine revolution dependent pressure pick-up element 11 which is connected to it. The pick-up element 11 is subjected to the constant reservoir air pressure by means of the piping 12 and supplies the control pressure that is developed from it to the control element 1 through means of the piping 13. It is possible to utilize in the present invention either of two types of revolution dependent pressure pick-ups, such as those which develop an increasing control pressure in the piping 13 with increasing revolution or such as those which develop a decreasing control pressure in the piping 13 with increasing revolution.

The control element 1, which is illustrated in FIG. 3, is adapted for utilization with a pneumatic pressure pick-up 11 that has an increasing pressure with increasing revolutions. It includes an intake valve piston 15 which is loaded by means of the spring 14 and which is arranged in the pressure chamber 21 in a sealed manner. The piston 15 also includes the intake valve seat 16 and the double valve body 17. The intake valve is constantly connected to the auxiliary air reservoir 6 by means of the chamber 18 and the piping 5. By means of the hand operated thread spindle 2, the intake valve piston 15 is servo controlled. There is provided coaxially with the piston 15 a graduated piston having integral portions 20 and 20a, which graduated piston is loaded by means of the pressure spring 19 and which is movable independently of the piston 15. The smaller piston portion 20a is hollow and extends into the control pressure chamber 21 in a sealed manner, its head forming the exhaust valve seat 22. The larger piston portion 20 of the graduated piston has its cylinder divided into a pressure sealed chamber 23 and the exhausting chamber 24.

The manner of operation of the above-described apparatus and particularly the control element 1 in accordance with the invention will now be described. It is assumed that the regulating device 9 controls the supply of the fuel to the power machine 10 (FIG. 1). In accordance with the scale 4 (FIG. 2), the hand operated thread spindle 2 is adjusted to a selected engine revolution by moving it in a downward direction, thus forcing the intake valve piston 15 downward a definite amount; thereby, the exhaust valve 22 is closed off and the intake valve 16 is opened in accordance with the disposition of piston 15 along its path. The graduated piston portions 20 and 20a are shown in the upper terminal position. After the opening of the intake valve 16, the control chamber 21 receives from the chamber 18 the full reservoir pressure, which pressure also activates the piston 8 of the regulating device 9 through means of the piping 7 whereby a high fuel supply flow takes place. This leads to an increase in the motor speed and a proportionate increase in the pressure supplied by pick-up 11 which is connected to it. The latter provides, with the increasing revolutions, also an increasing pressure through the piping 13 into the chamber 23.

Now, the graduated piston 20 and 20a is subjected on both sides by activated forces of which the one is exerted by means of the pressure spring 19 while the opposing force is exerted by means of the pressure of the chamber 23 acting on the circular area of the larger piston 20 combined with the pressure in the control chamber 21 acting upon the front diameter of the smaller piston 20a. Whenever the sum of the last forces overcomes that exerted by means of the spring force 19, then the graduated piston moves downward until the intake valve 16 closes and the exhaust valve 22 opens. Hereby the pressure in the control chamber 21 and in the piping 7 is reduced whereupon the regulating device 9 reacts with a throttling of the fuel supply.

Since each engine revolution corresponds to a very definite pressure of the pressure pick-up in the piping 13 and the chamber 23, the graduated piston 20 and 20a is displaced primarily in response to the revolutions of the power machine whenever it is constructed as illustrated, that is to say, not pressure loaded. With a pressure loaded arrangement (not shown), the operation of the graduated piston is wholly dependent upon engine revolutions. However, the pressure loaded arrangement is not necessary to efficient operation of the apparatus.

In accordance with the above operation with increased output requirements on the motor and therewith slight reduction of its revolutions, there results immediately a reduction of the pressure pick-up pressure in the chamber 23 whereupon it activates an upward movement of the graduated piston 20 and 20a, and, as a consequence, there occurs an opening of the intake valve 16, a pressure increase in the chamber 21 and the piping 7 and therewith an increase in the fuel feed supply. The revolutions are again increased to the selected value.

The selected number of revolutions per unit time is determined from the amount of travel which the intake valve piston 15 is moved downward by means of the hand operated thread spindle 2. This is true because the pressure spring 19 is characterized by the need for the application of a progressively increased force for each additional increment of travel. The intake valve piston 15, which has been displaced a large amount of travel downward, provides initially a larger opening of the intake valve 16. The initial pressure in the control chamber 21 can then only be equalized after a correspondingly larger downward movement of the graduated piston 20 and 20a, that is to say, after a stronger compression of the pressure spring 19. This, however, requires a higher supplied pressure for the pressure pick-up element 11 in the chamber 23 which, in turn, requires a higher revolution per unit time of the power machine.

By means of the coordinated action of the given travel of the intake valve seat 16 with the revolution dependent control pressure in the chamber 23 on the one side of the piston 20, 20a and the pressure of the spring 19 on the other side, there is provided the proportional relationship between the control travel of the hand operated thread spindle 2 and the ideal motor revolutions. Hereby, the initial pressure which exists in the control chamber 21 is corrected in such a manner by means of the intake valve and the exhaust valve that the control piston 8 of the regulating device 9 is always subjected to the pressure which is required for the maintaining of the engine revolutions constant. Thus, even though the operative output of the motor can fluctuate, the engine revolutions per unit time remain constant.

A similar type utilization of above-described apparatus, including the control element 1, is also possible with other power machines. For example, regulatable drives can be controlled in the same manner whereby the regulating device 9 influences a drive rotation moment.

The modification of the control element 1, which is illustrated in FIG. 4, provides for the utilization of a pressure pick-up element 11a which provides a decreasing pressure in proportion to increasing engine revolutions. Corresponding to this function there is provided an exhausting chamber 23a and a pressure spring 19a disposed above it and disposed on the side of the large piston 20 which is utilized as the exhaust valve seat. Its opposite side is activated by the pressure of the pressure pick-up element 11a. The manner of operation is, however, the same as that of the design in accordance with FIG. 3, that is, with increasing engine revolutions; the pressure in the chamber 23a is reduced and the graduated piston 20 and 20a is displaced in a downward direction.

In FIG. 5, there is illustrated a modification of the control element 1 emphasizing the structure for the servo controlling of the intake valve piston 15. In this construction, the control element 1 further includes a cylinder 26 and a piston 27 therein which has a piston rod 28 to transfer the piston travel to the intake valve piston by means of a rocker arm 29 which is rotatable around an axle 30. By means of a regulating valve 31, the piston 27 is pressed upward a predetermined distance and the intake valve piston 15 is moved correspondingly downward. The hand operated thread spindle 2 can be held in reserve as a second or auxiliary control means.

Figure 6:
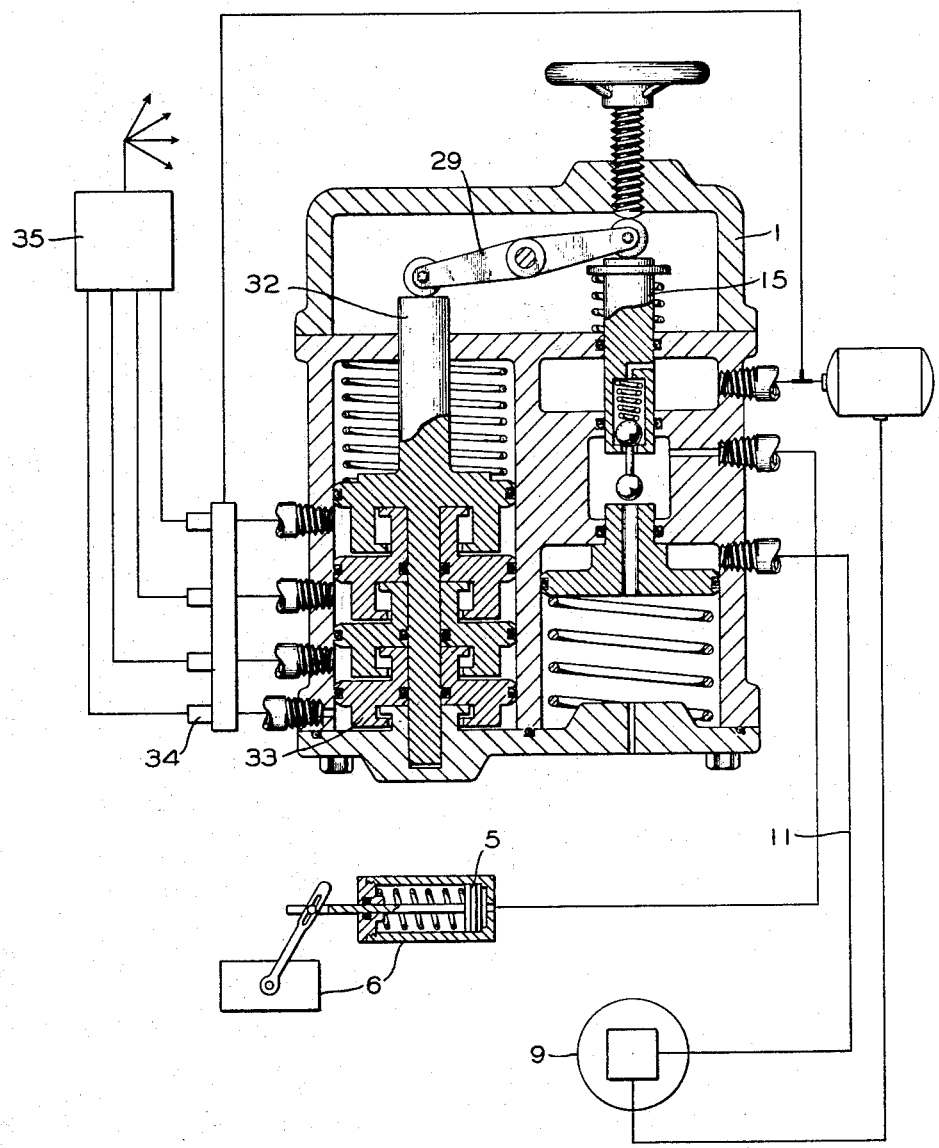
FIG. 6 is a cross-sectional view of the control element of FIG. 3 in combination with another remote control responsive operating mechanism.

A further modification of the servo control mechanism is illustrated in FIG. 6. On the same rocker arm 29 there operates a piston rod 32 of a multiple position regulating device 33 having 15 positions. The servo controlling takes place in the conventional manner by means of magnet valves 34 which correspond to the engine revolutions and which are controlled by means of an electric drum switch (not shown) in accordance with an established program. In addition, a remote controlling of the magnet valves 34 is possible by the utilization of radio through a corresponding number of channels whenever a receiver 35 is arranged for it.

If desired, the cylinder 26, the piston 27 with the piston rod 28 in accordance with FIG. 5, as well as the multiple position regulating device 33 in accordance with FIG. 6, can be simultaneously included in a single embodiment (not shown). In this event, the upper front areas of the piston rods 28 and 32 contact the upper front area of the intake valve piston 15, while the rocker arm 29, as well as the hand operated spindle 2, are omitted.

The above-described apparatus operates pneumatically. It has an essential advantage over the hydraulic arrangements in that it is completely free of supply failure from viscosity fluctuations and air bubbles in the fluid pressure medium and that they, therefore, always operate accurately and sensitively. Also, the utilization of a pneumatically operated revolution dependent pressure pick-up element provides a simpler and cheaper apparatus in contrast to corresponding electrical apparatus.

Having now described the invention, what we claim as new and desire to secure by Letters Patent, is:

1. A pneumatic constant speed control apparatus for automatically maintaining the revolutions per unit time of a power machine at selectively predetermined values, comprising:
    (a) a first pressure chamber having walls and an output port therein,
    (b) a first piston axially slidable within said first chamber and extending through one of said walls,
    (c) an intake passageway within said first piston terminating at one end at an aperture at the end face of said piston, said aperture formed to comprise a valve seat within said passageway, and said passageway terminating at the other end at an aperture disposed away from the said end face, the latter said opening adapted to be communicated with a pressure supply line,
    (d) an intake valve member in said passageway and adapted to seat internally on said aperture comprising a valve seat,
    (e) a second pressure chamber having walls and disposed adjacent said first pressure chamber,
    (f) a piston in said second pressure chamber and having an axially extending portion slidably extending through one of said walls of said second pressure chamber and into said first pressure chamber, said second piston disposed coaxially with said first piston,
    (g) means in said second pressure chamber and disposed on one side of said second piston biasing said second piston to one extremity of its travel,
    (h) an exhaust passageway extending through said second piston and terminating at one end in the end face of said axially extending portion to form a valve seat, and terminating at the other end at an aperture communicating with said second pressure chamber on the same side of said piston as the said biasing means,
    (i) an exhaust port at the end of said second chamber on the same side of said piston as the said biasing means,
    (j) an exhaust valve member adapted to externally seat upon said valve seat in said second piston,
    (k) means rigidly connecting said exhaust valve member to said intake valve member for closing said intake valve while opening said exhaust valve when said first and second pistons are spaced apart a distance exceeding a predetermined distance and for opening said intake valve while closing said exhaust valve when said first and second pistons are spaced apart a lesser distance than said predetermined distance,
    (l) an input port in said second pressure chamber for supplying pressure to the pressure chamber on the side of said piston opposite said side having said biasing means,
    (m) means connected between the pressure supply and the input port in said second pressure chamber for providing an output pressure to said input port, said output pressure being proportional to the revolutions per unit time of an engine, and
    (n) pressure responsive throttle regulator means for providing fuel to said engine and connected to the output port of said first pressure chamber.

2. The pneumatic constant speed control apparatus for automatically maintaining the revolutions per unit time of a power machine at selectively predetermined values as recited in claim 1, but in which:
    (a) said biasing means is disposed in said second pressure chamber on the side of said second piston away from said first pressure chamber to bias said second piston to its terminal position toward said first pressure chamber, and
    (b) said means for providing an output pressure proportional to said engine revolutions per unit time being further characterized in that said pressure is directly proportional to said revolutions per unit time.

3. The pneumatic constant speed control apparatus for automatically maintaining the revolutions per unit time of a power machine at selectively predetermined values as recited in claim 1, but in which:
    (a) said biasing means is disposed in said second pressure chamber on the side of said second piston toward said first pressure chamber to bias said second piston to its terminal position away from said first pressure chamber, and
    (b) said means for providing an output pressure proportional to said engine revolutions per unit time being further characterized in that said pressure is inversely proportional to said revolutions per unit time.

4. The pneumatic constant speed control apparatus for automatically maintaining the revolutions per unit time of a power machine at selectively predetermined values as recited in claim 1, but further including:
    (a) a rocker arm disposed for rocker motion about a pivot displaced from and fixed with respect to said first pressure chamber, one end of said rocker arm disposed to exert a force on said first piston to move said first piston axially along its path,
    (b) a piston chamber fixed with respect to said first pressure chamber and including a piston disposed so that its movement exerts a force on the other end of said rocker arm to move said first piston, and (c) a pressure supply port in said piston chamber for connection to an adjustable fluid pressure supply.

5. The pneumatic constant speed control apparatus for automatically maintaining the revolutions per unit time of a power machine at selectively predetermined values as recited in claim 4, but further including:

(a) fluid pressure responsive means for selectively positioning said piston in said piston chamber in successively different ones of a predetermined number of different axial positions.

References Cited by the Examiner

UNITED STATES PATENTS

| | | | |
|---|---|---|---|
| 1,747,910 | 2/1930 | Sieforth | 137—107 |
| 2,247,989 | 7/1941 | Cita | 137—36 |
| 2,280,128 | 4/1942 | Price | 137—37 X |
| 2,451,162 | 10/1948 | Gates | 137—627.5 |
| 2,706,995 | 4/1955 | May | 137—627.5 X |
| 2,812,218 | 11/1957 | Fitch | 137—627.5 X |
| 2,989,978 | 6/1961 | Gresko | 137—627.5 X |

WILLIAM F. O'DEA, *Primary Examiner.*

CLARENCE R. GORDON, *Examiner.*